United States Patent
Patel et al.

(10) Patent No.: US 10,868,461 B2
(45) Date of Patent: Dec. 15, 2020

(54) THREE PHASE FLUX SWITCHING ELECTRIC MACHINE WITH ORTHOGONALLY ORIENTED MAGNETS

(71) Applicant: HAMILTON SUNDSTRAND CORPORATION, Charlotte, NC (US)

(72) Inventors: Dhaval Patel, Loves Park, IL (US); Andrew R. Wilkinson, Cherry Valley, IL (US); Andreas C. Koenig, Rockford, IL (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 523 days.

(21) Appl. No.: 15/621,083

(22) Filed: Jun. 13, 2017

(65) Prior Publication Data
US 2018/0358877 A1   Dec. 13, 2018

(51) Int. Cl.
*H02K 21/44* (2006.01)
*H02K 1/24* (2006.01)
*H02K 1/27* (2006.01)
*H02K 21/38* (2006.01)

(52) U.S. Cl.
CPC .......... *H02K 21/44* (2013.01); *H02K 1/24* (2013.01); *H02K 1/27* (2013.01); *H02K 21/38* (2013.01)

(58) Field of Classification Search
CPC .......... H02K 21/44; H02K 21/38; H02K 1/24; H02K 1/27
USPC .................................................. 310/156.53
See application file for complete search history.

(56) References Cited

U.S. PATENT DOCUMENTS

| | | | | |
|---|---|---|---|---|
| 7,791,232 B2* | 9/2010 | Purohit | .................. | B24B 23/03 310/68 B |
| 9,543,876 B2* | 1/2017 | Patel | ..................... | H02K 19/12 |
| 9,577,479 B2 | 2/2017 | Polluck et al. | | |
| 2010/0295389 A1* | 11/2010 | Tessier | .................. | H02K 1/145 310/46 |
| 2013/0154397 A1* | 6/2013 | Sullivan | ................. | H02K 21/00 310/12.18 |

(Continued)

FOREIGN PATENT DOCUMENTS

| CN | 101552497 A | 10/2009 |
|---|---|---|
| CN | 103973062 A | 8/2014 |

OTHER PUBLICATIONS

European Search Report for Application No./Patent No. 18176827.6-1202 dated Oct. 26, 2018; 10 pgs.

*Primary Examiner* — Forrest M Phillips
(74) *Attorney, Agent, or Firm* — Cantor Colburn LLP (57) ABSTRACT

A multiphase switched flux electric machine including a rotary drive shaft, a ferromagnetic salient pole rotor assembly operably coupled to the rotary drive shaft having a plurality of rotor teeth defining a circumferential outer periphery of the rotor assembly, and a stator assembly. The stator assembly includes a ferromagnetic stator core, a plurality of permanent magnets positioned substantially equidistant about an inner circumference of the stator core, a plurality ferromagnetic stator teeth mounted to the permanent magnets on the stator core with distal ends forming an inner periphery of the stator assembly, the inner periphery proximate the outer axial periphery of the rotor assembly separated by an air gap; and a plurality of stator coils with an axial active portions disposed within selected teeth of the plurality of ferromagnetic stator teeth.

21 Claims, 11 Drawing Sheets

(56) References Cited

U.S. PATENT DOCUMENTS

| | | | |
|---|---|---|---|
| 2013/0249324 A1* | 9/2013 | Gandhi | H02K 41/033 310/12.18 |
| 2014/0042851 A1* | 2/2014 | Takemoto | H02K 1/243 310/114 |
| 2014/0049124 A1* | 2/2014 | Gandhi | H02K 1/246 310/46 |
| 2014/0103752 A1* | 4/2014 | Hofmeister | H02K 21/44 310/46 |
| 2016/0344272 A1* | 11/2016 | Sarlioglu | H02K 21/44 |

* cited by examiner

THREE PHASE FLUX SWITCHING ELECTRIC MACHINE WITH ORTHOGONALLY ORIENTED MAGNETS

FIELD OF DISCLOSURE

The subject matter disclosed herein relates electric machines used as both a starter and a generator in aeronautical applications. More specifically, the subject disclosure relates to the permanent magnet generator (PMG) component as employed in a wound field synchronous machine (WFSM).

BACKGROUND

Traditional electric machines operating as motors/generators utilize a rotor, which contains a set of magnets or a electromagnets, disposed in an stator containing a multiphase (typically three) winding such that electromagnetic interaction between the magnets and the windings cause the rotor to move relative to the stator or motion of the rotor relative to the stator to induce a voltage in the stator. In some cases, the magnets or electromagnets are installed in the stator and the multi-phase winding is installed in the rotor. In a system with an electromagnet an excitation system is required to energize the electromagnet.

Electromechanical power transfer systems for aeronautical applications may integrate main and auxiliary engine start functions with onboard electric power generating equipment. A conventional brushless, wound field synchronous machines (WFSM) is ideal for such an electromechanical power transfer system wherein it may serve as both a starter and a generator. It is a logical choice for modern variable frequency (VF) alternating current (AC) electric system architectures. A WFSM that serves as both a starter and a generator is representative of a class of variable speed motor drives in the start mode of operation that uses a solid-state power converter to process typically high potential direct current (DC) electric power into VF AC electric power suitable for driving the variable speed AC electric machine.

Aeronautical applications typically use a brushless WFSM, which is actually three electric machines using a common shaft in the same housing. The common shaft functions as a rotor that turns inside various sets of stator windings of the three machines. The three electric machines typically include a permanent magnetic generator (PMG), an exciter and a primary machine.

In some applications, the PMG is installed on another shaft that is geared to the main shaft containing the exciter and the primary machine. The rotor may be turned by an engine or a gear box or a gear train. The PMG portion of the WFSM is formed from a section of the rotor having permanent magnets in it and a stator with a three phase winding, thereby, as the rotor turns, the PMG generates AC power because the rotating magnets induce AC current in the stator.

The exciter consists of a rotor with AC windings and a stator with windings. The stator can have DC windings set up in a salient pole configuration or AC windings setup in a three phase configuration similar to an induction machine. During starter/motor mode, the exciter stator is excited with AC power that can be sourced from the generator control unit (GCU) or an aircraft bus. If the GCU is generating the AC power for the exciter, GCU may be sourced from the batteries, ground power or an existing aircraft bus. During generate mode, the GCU rectifies the AC power from the PMG to DC power for use in the GCU control circuits and provides the primary machine excitation via a DC to DC converter. The GCU will source the exciter with DC power in order to excite the primary machine. When the exciter is energized, in both starter/motor and generate modes, the stator windings form magnetic north-south pole pairs. Because the exciter rotor windings are three phase, the output power generated is continuous three phase AC in both modes of operation. A rotating rectifier is often included to convert the exciter AC output to DC for presentation to the primary machine.

The primary machine has a rotor with a DC winding and a stator with an AC winding. Thus, as the rotor rotates, it generates an electromotive force (EMF) and produces power.

In some previous designs the PMG has consisted of a single phase flux switching generator (FSG) or a three phase PMG. For both designs, the PMG output is AC. The single phase FSG provides a simple construction. However, the obvious disadvantage of a single phase FSG is that it is single phase, so it does not produce continuous power when converted from AC to DC. As a result, the GCU must include a filter which includes a large capacitor bank in comparison to a GCU sourced with three phase power. Additionally, the load regulation is very poor in the single phase system.

The three phase PMG typically consists of a stator with three phases and is a surface mounted permanent magnet rotor. The magnets are mounted onto a hub with a containment band installed around the outer diameter for magnet retention. Although three phase PMG's provide continuous 3 phase power to the GCU and reduce the size of the machine, its rotor magnets tend to be brittle and require careful handling during all piece part and next higher assembly phases. During assembly, the magnets can easily chip or crack leading to weak points and creating contamination in the machine. Moreover, the operating speeds require a containment band to prevent the magnets from flying off the rotor, but this construction still limits rotational speeds for the machine. Containment bands are typically non-magnetic (e.g., titanium, inconel) to reduce leakage inductance and losses. The bands are expensive and difficult to produce due to the hardness of the non-magnetic materials. As a result, costs can be high due to the magnet material and the containment band material. Finally, conventional configurations for three phase PMG typically are limited in size and power density based on constraints associated with dissipating heat internally in the rotor and magnets. Improvements in thermal management would improve configuration and power density for electric machines.

BRIEF SUMMARY

According to an embodiment of the invention, described herein is a multiphase switched flux electric machine including a rotary drive shaft, a ferromagnetic salient pole rotor assembly operably coupled to the rotary drive shaft having a plurality of rotor teeth defining a circumferential outer periphery of the rotor assembly, and a stator assembly. The stator assembly includes a ferromagnetic stator core, a plurality of permanent magnets positioned substantially equidistant about an inner circumference of the stator core, a plurality ferromagnetic stator teeth mounted to the permanent magnets on the stator core with distal ends forming an inner periphery of the stator assembly, the inner periphery proximate the outer axial periphery of the rotor assembly separated by an air gap; and a plurality of stator coils with an axial active portions disposed within selected teeth of the plurality of ferromagnetic stator teeth. In addition to one or more of the features described above, or as an alternative, further embodiments may include that.

In addition to one or more of the features described above, or as an alternative, further embodiments may include that the ferromagnetic salient pole rotor is constructed of at least one of steel laminations, sintered magnetic powder, stamped ferromagnetic material, or a solid ferromagnetic material.

In addition to one or more of the features described above, or as an alternative, further embodiments may include that the salient pole rotor includes 28 rotor teeth.

In addition to one or more of the features described above, or as an alternative, further embodiments may include that the salient pole rotor is constructed of at least one of steel laminations, sintered magnetic powder, stamped ferromagnetic material, or a solid ferromagnetic material.

In addition to one or more of the features described above, or as an alternative, further embodiments may include that the ferromagnetic stator core is constructed of at least one of steel laminations, sintered magnetic powder, stamped ferromagnetic material, or a solid ferromagnetic material.

In addition to one or more of the features described above, or as an alternative, further embodiments may include that the ferromagnetic stator core is constructed without steel laminations.

In addition to one or more of the features described above, or as an alternative, further embodiments may include that the ferromagnetic stator core includes flat portions positioned about its inner circumference.

In addition to one or more of the features described above, or as an alternative, further embodiments may include that the substantially flat portions correspond to the permanent magnets and stator teeth.

In addition to one or more of the features described above, or as an alternative, further embodiments may include that the permanent magnets are substantially rectangular and configured to operably interface with the substantially flat portions of the ferromagnetic stator core.

In addition to one or more of the features described above, or as an alternative, further embodiments may include that the permanent magnets are substantially rectangular and include an arcuate surface configured to operably interface with the inner circumference of the ferromagnetic stator core.

In addition to one or more of the features described above, or as an alternative, further embodiments may include that the permanent magnets are magnetized circumferentially.

In addition to one or more of the features described above, or as an alternative, further embodiments may include that the ferromagnetic stator teeth are substantially "U" shaped with a flat bottom configured to interface with the permanent magnets.

In addition to one or more of the features described above, or as an alternative, further embodiments may include that the ferromagnetic stator teeth is constructed of at least one of: steel laminations, sintered magnetic powder, stamped ferromagnetic material, and a solid ferromagnetic material.

In addition to one or more of the features described above, or as an alternative, further embodiments may include that the plurality of stator coils further include circumferential inactive portions disposed substantially at the circumference of but axially displaced from the stator core.

In addition to one or more of the features described above, or as an alternative, further embodiments may include that the plurality of stator coils are stacked axially for each phase of the multiphase machine.

In addition to one or more of the features described above, or as an alternative, further embodiments may include at least one of a non-ferrous top cover and non-ferrous bottom cover, the least one of a non-ferrous top cover and non-ferrous bottom cover configured to at least one of hold the stator teeth and permanent magnets in a selected position and facilitate arrangement of the plurality of stator coils on the stator core.

In addition to one or more of the features described above, or as an alternative, further embodiments may include that the at least one of a non-ferrous top cover and non-ferrous bottom cover are constructed of a material that exhibits high thermal conductivity.

Also described herein in an embodiment is a wound field synchronous machine (WFSM). The WFSM including a three phase FSG having, a rotary drive shaft, a salient pole rotor assembly operably coupled to the rotary drive shaft having teeth defining an outer periphery of the rotor assembly, and a stator assembly. The stator assembly including a ferromagnetic stator core, a plurality of permanent magnets positioned substantially equidistant about an inner circumference of the stator core, a plurality ferromagnetic stator teeth mounted to the permanent magnets on the stator core with distal ends forming an inner periphery of the stator assembly, the inner periphery proximate the outer axial periphery of the rotor assembly separated by an air gap; and a plurality of stator coils with an active portions disposed within selected teeth of the plurality of ferromagnetic stator teeth. The WFSM also includes a an exciter coupled to said three phase FSG and a main machine coupled to said exciter, wherein the WFSM comprises a variable input speed range and a variable frequency (VF) architecture.

In addition to one or more of the features described above, or as an alternative, further embodiments may include that the three phase FSG provides excitation power for said exciter.

In addition to one or more of the features described above, or as an alternative, further embodiments may include that the exciter energizes said main machine.

In addition to one or more of the features described above, or as an alternative, further embodiments may include a common rotor for said three phase FSG, said exciter and said main machine.

In addition to one or more of the features described above, or as an alternative, further embodiments may include that a rectifier coupled between said exciter and said main machine, wherein said rectifier converts AC power from said exciter to DC power for said main machine.

Also described herein in an embodiment is a WFSM having a generate mode and a starter mode, the WFSM including a means for generating three phase excitation power with a three phase FSG having a plurality of permanent magnets positioned substantially equidistant about an inner circumference of and proximal to a stator core, a means for generating electromotive force (EMF) in response to said excitation power, a means for inducing a voltage in response to said EMF, wherein the WFSM comprises a variable frequency (VF) architecture, and wherein a load coupled to said means for inducing draws a current.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The accompanying drawings are presented to aid in the description of various embodiments and are provided solely for illustration of the embodiments and not limitation thereof.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. Alternate embodiments may be devised without departing from the scope of the invention. Additionally, well-known elements of the invention will not be described in detail or will be omitted so as not to obscure the relevant details of the invention.

It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in Figure X may be labeled "Xa" and a similar feature in Figure Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

In general, embodiments herein relate generally to a three phase flux switching electric machine. Three phase flux switching machines have become popular because the machines operate similar to permanent magnet (PM) machines, however, the field magnets are located on the stator side of the assembly. In addition, three phase flux switching machines provide continuous power whereas single phase machines do not and require additional filtering.

Figure 1:
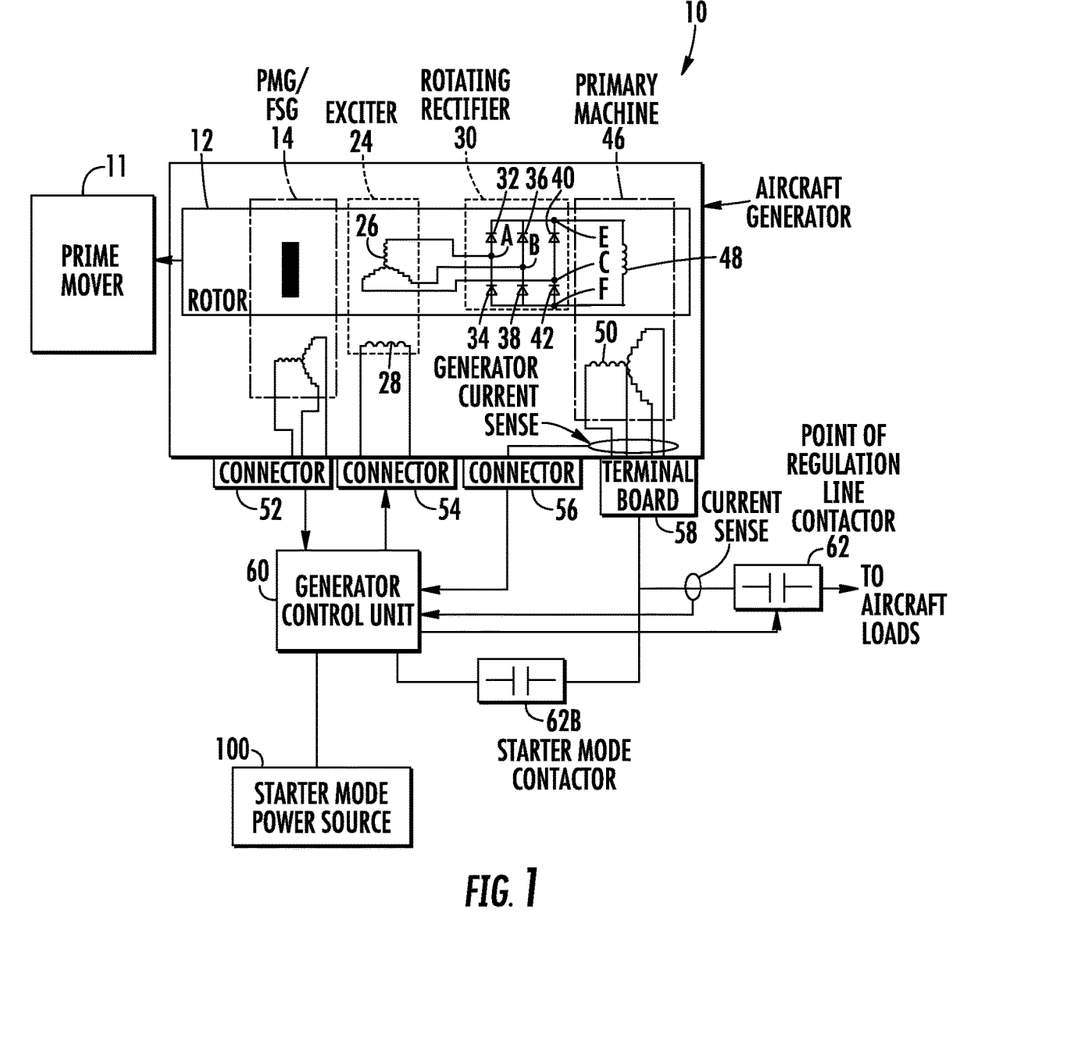
FIG. 1 is a partial schematic illustration of an electromechanical power transfer system, also known as a wound field synchronous machine (WFSM), of one embodiment.

FIG. 1 is a schematic diagram of a three stage wound field synchronous machine 10 and control system in accordance with an embodiment as may be employed for an aircraft generator. In general, the three stage synchronous machine 10 includes three electric machines that utilize a common shaft/rotor 12 in the same housing. In an embodiment, the three electric machines include a conventional three phase flux switching generator (FSG) 14, an exciter 24 and a primary machine 46, all joined to the coupling shaft/rotor 12. Also provided are a rotating rectifier 30, various connectors 52, 54, 56, a terminal board 58, a GCU 60, starter mode power source 100, a point of regulation line contactor 62, and a starter mode contactor 62B. The coupling shaft 12 extends from the three phase FSG 14 to the primary machine portion 46. The illustrated arrangement of the primary machine 46, the exciter portion 24, and three phase FSG 18, and other components is shown for example only. Other arrangements are possible, including configurations wherein the three phase FSG 14 is connected via gears to the main rotor shaft 12. As is known, the angular position of the rotor shaft 12 is required to properly orient a current communicating to the primary machine 46 relative to the magnetic north pole of the rotor 12 during starter mode.

Referring still to FIG. 1, the example WFSM 10 is configured to be driven by a prime mover 11, e.g., an engine, gearbox, and the like by rotating a main shaft 12. Although this example shows the single main shaft 12, other examples may include additional shafts. The prime mover 11 may include one or more gearboxes. In the example shown in FIG. 1, the prime mover is a gas turbine engine of an aircraft.

In another example, where the WFSM 10 operates as a motor, the prime mover 11 may be another type of device requiring rotation for operation.

The exciter 24 includes exciter rotor windings 26 configured to have three phases for generating a three-phase AC voltage, which is supplied to input terminals A, B, and C of the rotating rectifier assembly 30. The rectifier circuit of rotating rectifier assembly 30 includes diodes 32, 34, 36, 38, 40 and 42 connected in a bridge configuration to input terminals A, B, and C to rectify the AC voltage from the exciter rotor windings 26 into a DC voltage across output terminals E and F. Rectifier circuits formed of pairs of diodes 32/34, 36/38, and 40/42 between output terminals E and F each connect to one phase of exciter rotor winding 26. For example, diodes 32 and 34 form a rectifier circuit. Primary machine 46 includes main rotor field winding 48 and is electrically connected between output terminals E and F for receipt of the DC voltage.

Figure 2A:
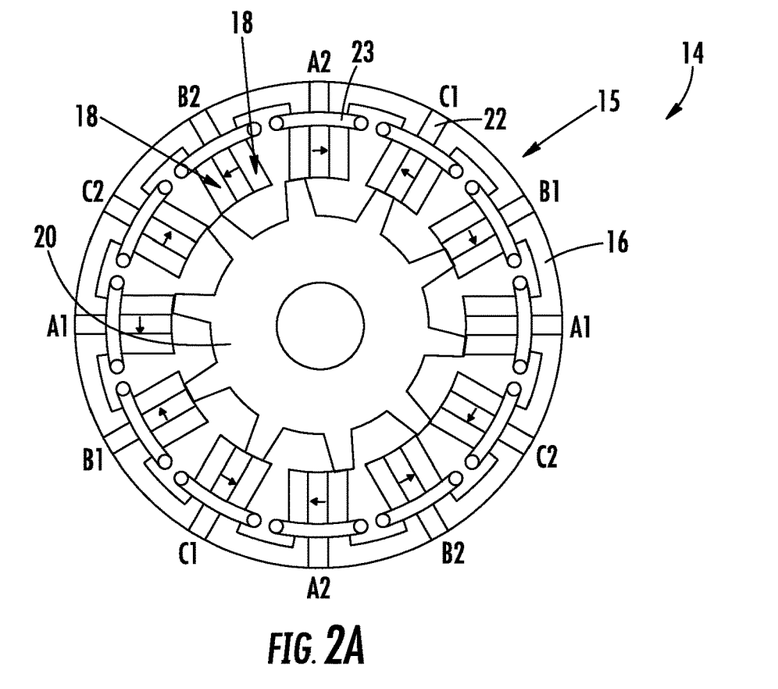
FIG. 2A illustrates a cross sectional view conventional flux switching as may be employed in the an larger three stage electric machine such as a WFSM.
Figure 2B:
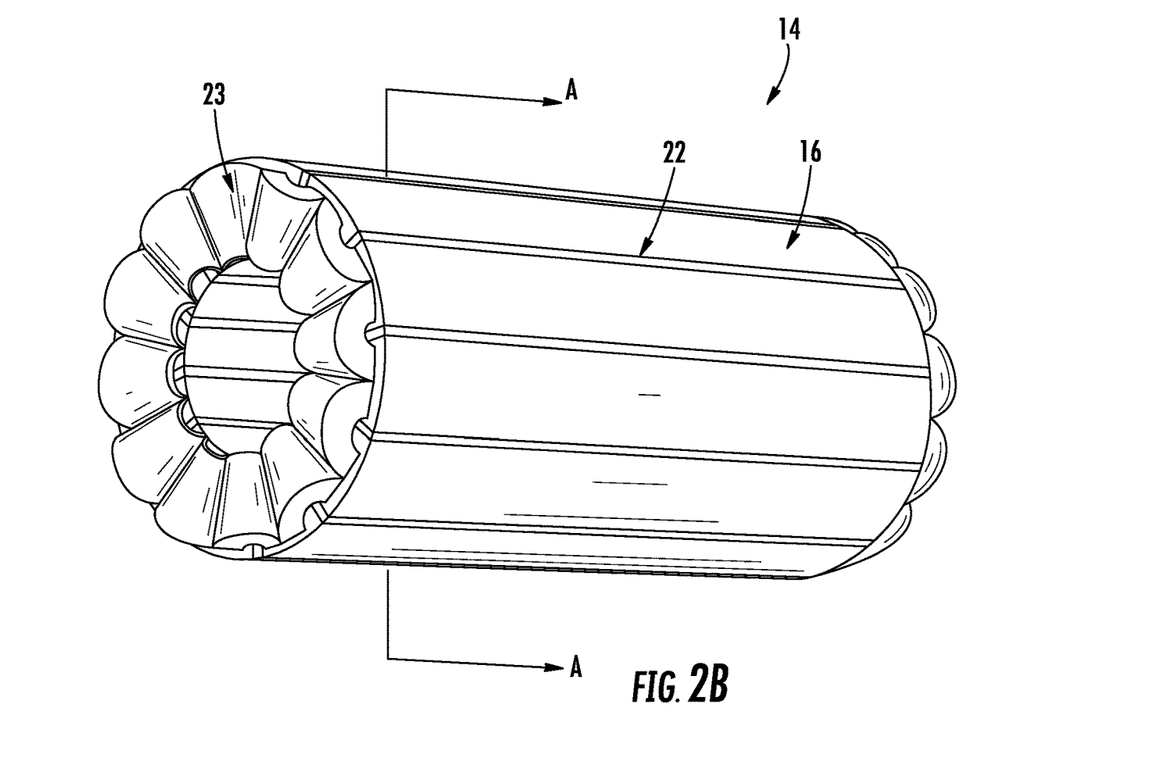
FIG. 2B illustrates a perspective view of conventional flux switching as may be employed in the an larger three stage electric machine such as a WFSM.

FIG. 2A depicts a cross sectional view of a conventional flux switching electric machine 14 as may be employed in conventional three stage machines. FIG. 2B depicts a perspective view of the conventional flux switching electric machine 14 (shown without the rotor for clarity). Conventional flux switching machines 14 are constructed with a stator assembly 15 including a ferromagnetic core 16 or back iron and a plurality of teeth 18 Conventional flux switching machines 14 typically utilize a salient rotor 20 in order to complete the magnetic circuit and either magnets 22 or an additional field winding in order to excite the armature coils 23. The armature coils 23 are typically designated with a conventional A, B and C phase nomenclature. In some flux switching electric machines 14 field windings (not shown) are used to boost or trim the magnetic field for finer magnetic flux control. Most all of the flux switching machines 14 utilize permanent magnets 22 that are transversely oriented. The permanent magnets 22 are typically placed between the stator poles formed from the teeth 18 with the windings or coils 23 wrapped around the pole formed of the teeth 18 and the permanent magnet 22. These windings 23 are concentrated coils, where the winding throw is one slot. One of the major benefits of the flux switching machine 14 is that the permanent magnets 22 can be stator mounted. This allows for a reduction in the rotor complexity because the rotor can be a punched lamination and constructed without regard to magnet retention or heat. This reduces the cost of the rotor 20 and allows for the use of high strength steel laminations to enable operation at high speed and/or high temperature. In addition, it can also allow for better cooling of the permanent magnets 22. However in the case of the transversely oriented magnets 22, the surface area of the magnet 22 available to dissipate or conduct heat is significantly reduced due to the orientation of the magnet 22, particularly if back iron cooling is utilized.

Another item to note in conventional flux switching designs is that the stator teeth 18 and back iron are all connected (i.e., the stator teeth 18 and core 16 or back iron are typically part of the same laminated structure). Moreover, in some cases the structure for the stator assembly can be very complex due to the magnetic paths required for the field windings. Complex structures can be costly due to the additional ferromagnetic material required and has less structural integrity than other materials such as alloy steel.

Figure 3:
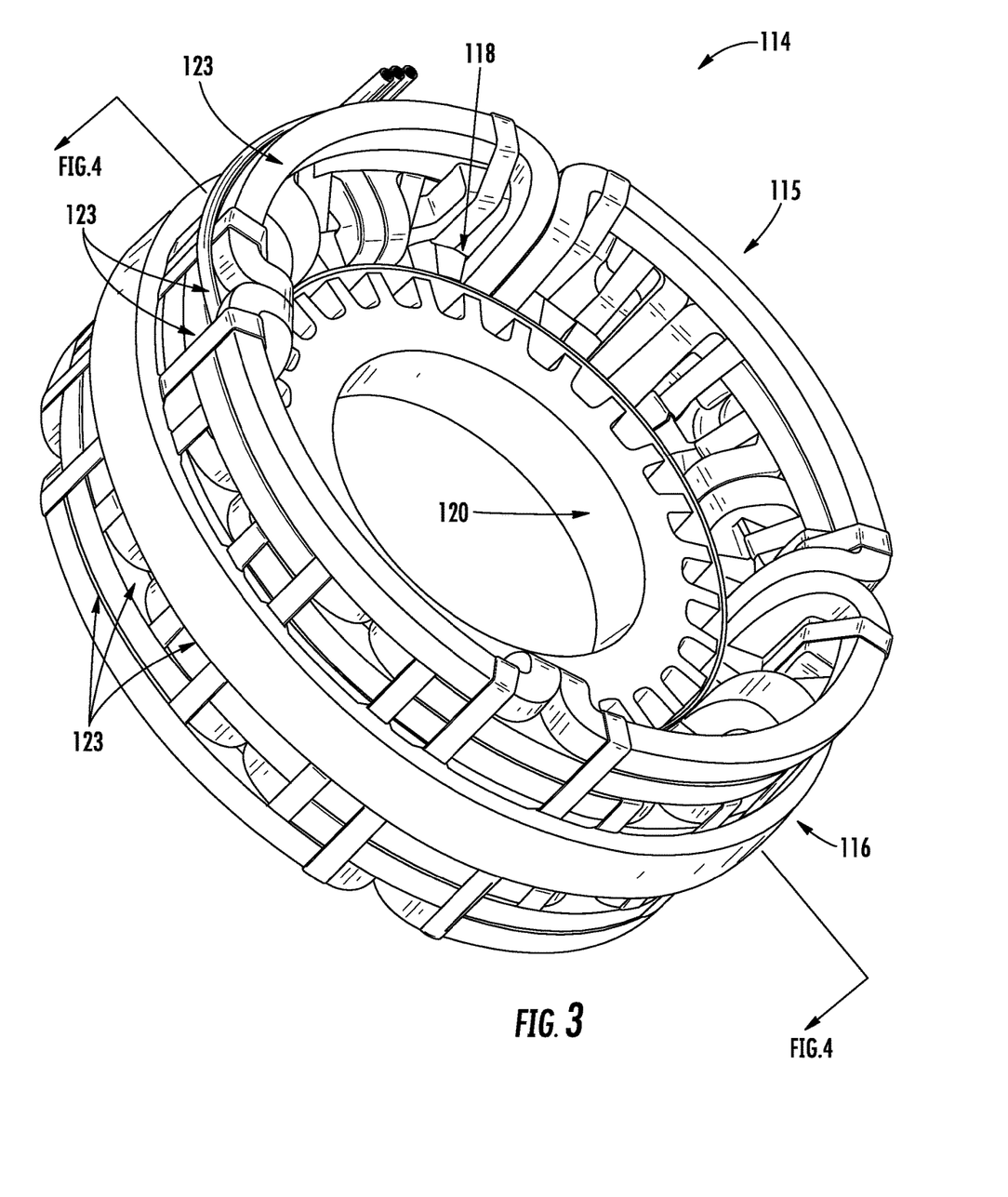
FIG. 3 depicts an isometric view of a flux switching electric machine in accordance with an embodiment as may be employed in the a larger three stage electric machine such as a WFSM.
Figure 4:
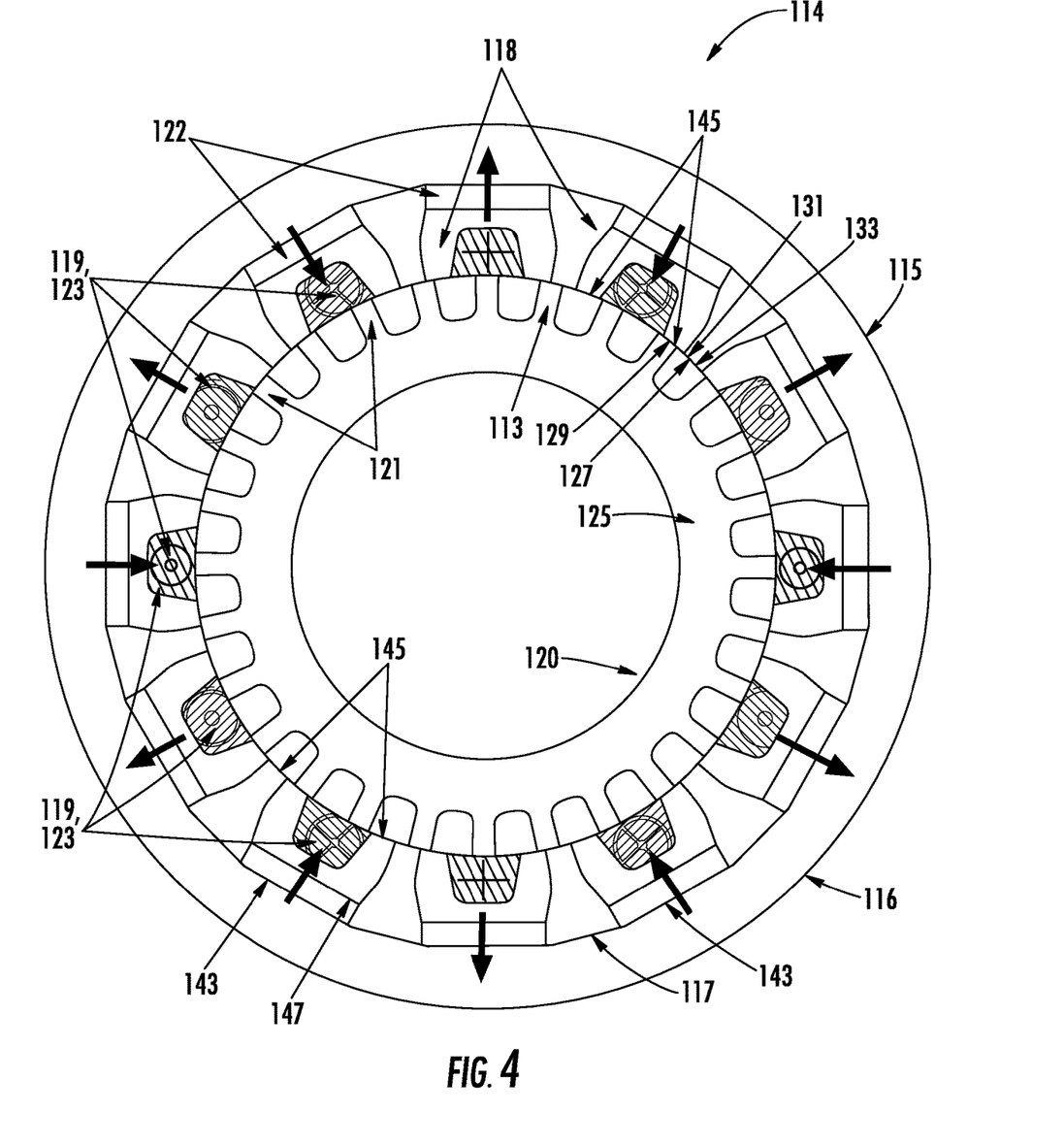
FIG. 4 depicts a partial cross sectional view of a flux switching electric machine in accordance with an embodiment as may be employed in the a larger three stage electric machine such as a WFSM.

FIGS. 3 and 4 illustrate examples of three phase flux switching electric machines 114 as maybe employed in place of the conventional FSG's 14, in accordance with the described embodiments and capable of being implemented as the three phase FSG 114 in a three stage machine of FIG. 1. FIG. 3 depicts an isometric view of the FSG 114 in accordance with an embodiment. FIG. 4 depicts a partial cross sectional view of the FSG 114 in accordance with an embodiment. It should be appreciated that for the purposes of simplicity, the focus of the description is directed to the FSG 114 as applicable separately or as a portion of a larger multistage electric machine 10 replacing the conventional FSG 14, wherein like elements are numbered with like reference numerals incremented by 100. The three phase flux switching machine 114 is a PM machine comprising a passive and robust salient-pole rotor assembly 120, and a salient-pole stator assembly 115 with armature windings 123 and permanent magnets 122 (FIG. 4).

In an embodiment, the three phase FSG 114 provides a simplified, rugged rotor structure, facilitating high speed, high torque density, and high efficiency. In particular, the ferromagnetic rotor structure mounted to a rotor shaft 12 includes a plurality of ferromagnetic teeth 121 coupled to the ferromagnetic rotor core 125, and arranged around the outer periphery 127 of the rotor core 125 forming salient poles. A distal end 129 of each rotor tooth 121 forming the outer periphery 127 of the rotor 120. In an embodiment, the rotor 120 has 28 teeth 121, though other numbers and tooth 121 configurations are possible and envisioned. In an embodiment, the rotor assembly 120 with ferromagnetic rotor core 125 and rotor teeth 121 may be fabricated as a cogged lamination stack, similar to conventional designs for salient pole rotors. In another embodiment, the rotor assembly 120 may be constructed of any variety of ferromagnetic materials including, but not limited to steel laminations, sintered magnetic powder material, or stamped or solid ferromagnetic material such a steel.

A multiple pole stator assembly shown generally as 115, typically of the multiphase alternating current (AC) type, circumscribes the rotor assembly 120. In an embodiment, the stator assembly 115 includes a substantially annular ferromagnetic core 116. A plurality of permanent magnets 122 are disposed substantially equidistant about an inner circumference 117 of the stator core 116 and magnetized circumferentially. In FIG. 4, arrows on the permanent magnets 122 depicts the magnetization polarity for each of the permanent magnets 122. The stator assembly 115 also includes a plurality of "U" shaped ferromagnetic stator teeth 118 positioned radially inward on the permanent magnets 122 about the inner circumference 117 of the stator core 116 forming north-south pole pairs in the multiple ferromagnetic stator teeth 118. In an embodiment, the ferromagnetic teeth include a proximal end 147 (i.e., the bottom of the "U") configured to interface with the permanent magnets 122. A distal end 145 of each stator tooth 118 forming an inner periphery 131 of the stator assembly 115 is proximate the outer annular periphery 127 of the rotor assembly 120. In one embodiment, a small air gap 133 exists between the outer annular periphery 127 of the rotor assembly 120 and the stator teeth 118 of the stator assembly 115. In an embodiment, the stator core 116 may include an inner circumference with substantially flat portions 143, the substantially flat portions 143 corresponding the number of permanent magnets 122 and stator teeth 118 to be positioned on the stator core 116. The flat surfaces are advantageous because they permit utilization of simpler rectangular permanent magnets 122. In another embodiment, the permanent magnets 122 are shaped with an arcuate surface outer radial surface to interface with the inner circumference of the stator core 116 without the substantially flat portions. In some configurations of electric machines employing the described embodiments, the alternative of arcuate shaped magnet is advantageous, for example, with larger electric machines. In some embodiments an arcuate permanent magnet 122 may be employed.

In an embodiment, the ferromagnetic stator core 116 and stator teeth 118 may be constructed of any variety of ferromagnetic materials including, but not limited to steel laminations, sintered magnetic powder material, or stamped or solid ferromagnetic material such as steel. In one embodiment steel laminations are employed. However, in another embodiment, the annular stator core 116 is a solid piece of steel. Advantageously, it will be appreciated that while the stator core 116 may be constructed of ferromagnetic steel laminations as would be required in conventional flux switching designs to reduce eddy currents in the materials, in the configuration of the described embodiments, however, it is not necessary because all of the alternating magnetic flux occurs in the tips of the of the rotor teeth 113 and stator teeth 118.

Figure 5:
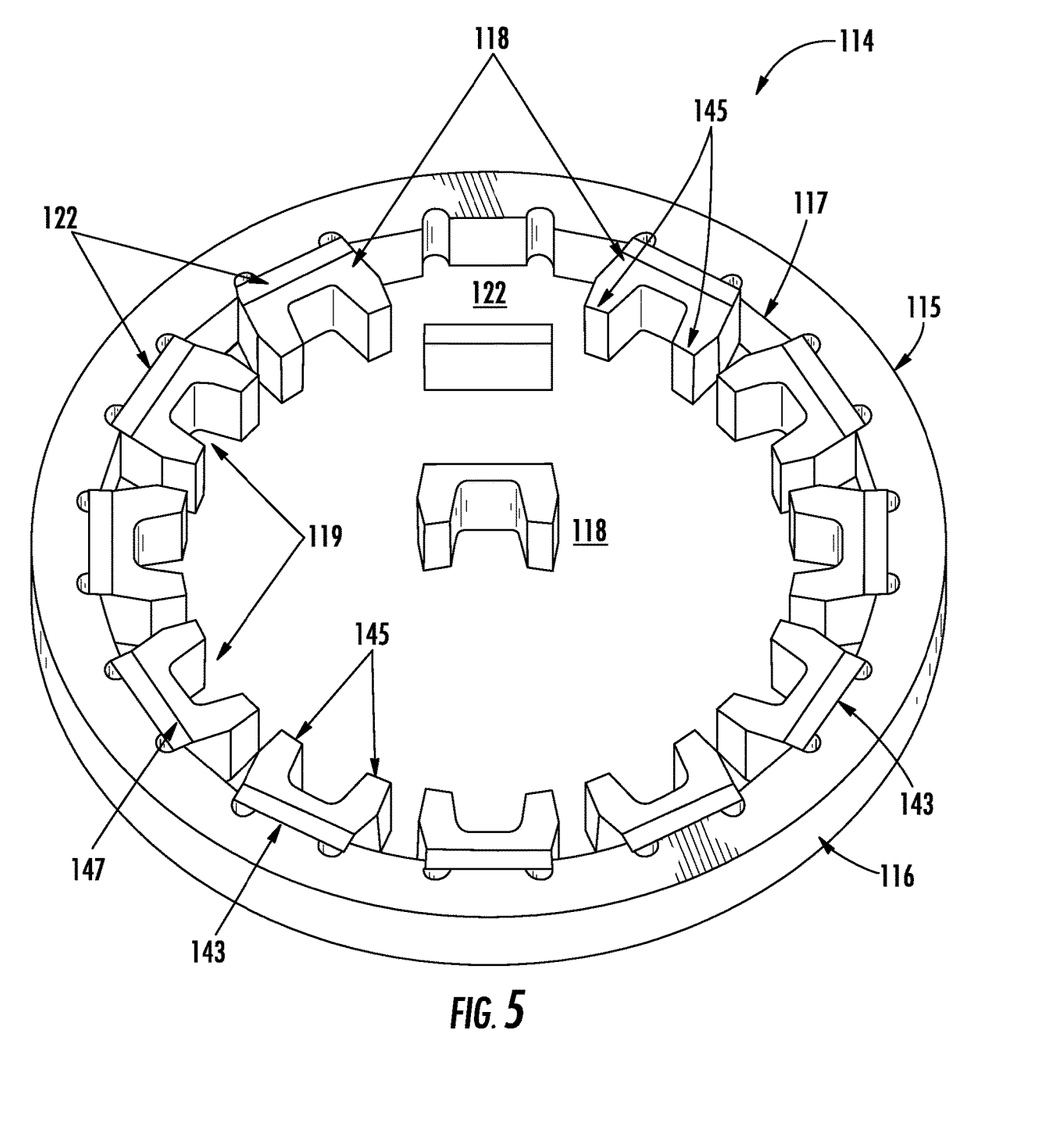
FIG. 5 depicts a portion of the stator of a flux switching electric machine in accordance with an embodiment.

Turning now to FIG. 5 as well, in an embodiment, the stator assembly 115 also includes multiple stator coils 123 (FIG. 4) with active portions disposed in the slots 119 within each of the stator teeth 118 and circumferential inactive portions disposed substantially at the circumference of but axially displaced from the stator core 116. The stator winding 123, is typically a set of three-phase winding. However, it should be understood that any number of phases can be employed and designed within the scope of the described embodiments. The minimum number of phases is three.

In an embodiment, a three phase stator coil 123 is wound with axial active portions within every third stator tooth 118 with alternating direction and thus polarity. The three phase coils 123 also have overlapping arcuate end turns stacked in an axial direction along the circumference of the stator core 116. Hence, the polarity of the permanent magnet flux linkage in the coils reverses when the rotor pole aligns the alternative stator tooth that belongs to the same phase, i.e., realizing the "flux-switching" action. Due to the magnetic reluctance difference between the two pair of coils composing a phase, the resultant phase EMF waveforms are essentially sinusoidal without any additional measures. Advantageously, in an embodiment because the active components, that is, the windings 123, teeth, 118, and permanent magnets 122 of the FSG 114 such as the permanent magnets 122 and stator windings 123 are all located on the stator assembly 115, simple yet effective machine cooling can be easily implemented.

The three phase FSG 114 of the disclosed embodiments is particularly advantageous for variable frequency (VF), AC electric system architectures having a wide or particularly high speed range and power densities. A typical speed range is approximately 2:1 for electric systems with VF architecture, resulting in a frequency range from about 360 Hz to about 800 Hz. In the described embodiments, moving the permanent magnets to the outside of the stator teeth 118 as provided for in conventional designs facilitates employing a simplified passive salient pole rotor 120 that is substantially unaffected by operation at high speeds. Thus, in applications as a PMG, for example the limitations regarding permanent magnet restraint for high speed applications are essentially eliminated. In addition, with the described embodiments including a unique configuration of providing improved thermal capability, power density, and heat dissipation with respect to existing FSG configurations. In particular, the described embodiments provide for relatively larger surface areas and point of contact for the permanent magnets 122. The increased surface area and placement of the permanent magnets 122 outward of the stator teeth 118 improves the ability of the FSG of the described embodiments to thermal properties are improved.

The three phase FSG design of the disclosed embodiment is also particularly effective at forcing its magnetic field through the D axis. It is a typical design goal for electric machines to attempt to force the magnetic fields to go in a certain direction on the D, Q axes and through certain areas of the electric machine. When operating an electric machine in generate mode, it is typical to force the magnetic field through the D axis, and this is typically accomplished by shaping the rotor iron such that it channels the magnetic field through the D axis. On the Q axis for the three phase FSG, there is just air space between the rotor's north and south poles. The magnetic fields are less likely move through the airspace (Q axis) and instead are more likely to move through the steel sections of the rotor, which include the D axis. Thus, the three phase FSG isolates the D axis from the Q axis.

Because the three phase FSG is effective at isolating the D axis from the Q axis, it improves the ability to more precisely identify the presence or absence of the magnetic field, thus creating high saliency. Therefore, the three phase FSG is also effective as a position sensor. Because the three phase FSG provides clean isolation of the D and Q axes, it provides clean isolation of the presence of a magnetic field (i.e., the D axis) from the absence of a magnetic field (i.e., the Q axis).

Accordingly, it can be seen from the foregoing disclosure and the accompanying illustrations that one or more embodiments of the FSG provide several advantages over conventional designs. For example, as a three phase system, the FSG allows for a lighter weight simpler GCU because the filter and smoothing requirements are smaller in three phase systems. The system allows for better load regulation because it is a three phase system. As depicted in the figures, the permanent magnets 122 are mounted in a stationary fashion which allows for ease of manufacture and high reliability. Additionally, unlike a conventional PMG, the magnets do not need structural retention due to high operating speeds. Because of the static mounting of the magnets onto the back-iron, there is a direct connection to a large thermal mass making it is easier to cool the magnets, thus providing better heat dissipation, higher efficiency, and power density. The rotor only consists of electrical steel, which makes the rotor more robust than other machine types and the operating speed can be very high.

Turing now to FIGS. 5-10, for a depiction of the assembly of the FSG 114 in accordance with an embodiment. FIG. 5 depicts a portion of the stator assembly 115 and the placement of the permanent magnets 122 and stator teeth 118 on the stator core 116.

Figure 6A:
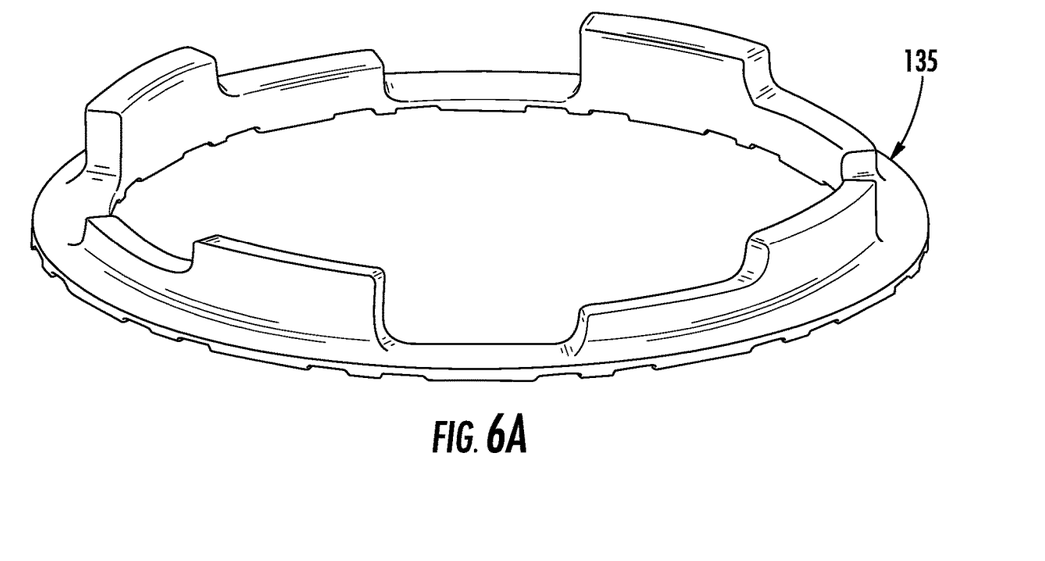
FIG. 6A depicts an isometric view of a nonferrous top cover of a flux switching electric machine in accordance with an embodiment.
Figure 6B:
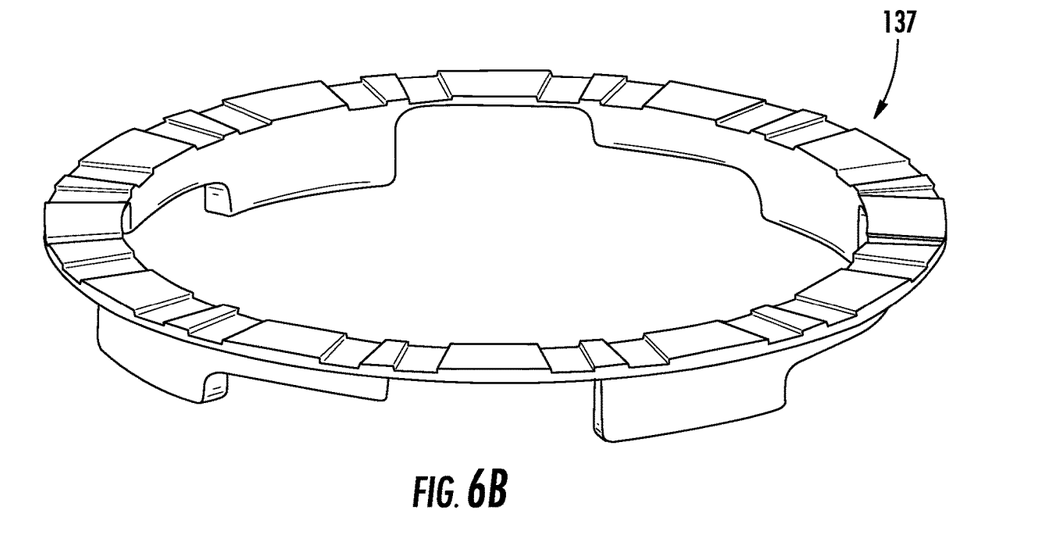
FIG. 6B provides an isometric view of a nonferrous bottom cover of a flux switching electric machine in accordance with an embodiment.

FIGS. 6A and 6B provide an isometric view of a nonferrous top cover 135 and bottom cover 137. The top and bottom covers 135, 137 are configured to hold the stator teeth 118 and permanent magnets 122 in position with the stator core 116. The top and bottom covers 135, 137 also facilitate arrangement of stator windings 123 and holding the windings 123 in position with the desired orientation and arrangement. If spray cooling is utilized to cool the end turns of winding 123, the top and bottom cover 135, 137 will facilitate equal impingement by maintaining the desired spacing of the windings 123. Preferably the top cover 135 and bottom cover 137 are fabricated of a material that includes electrical insulation to ensure that the stator windings 123 are isolated from the core 116.

Figure 7:
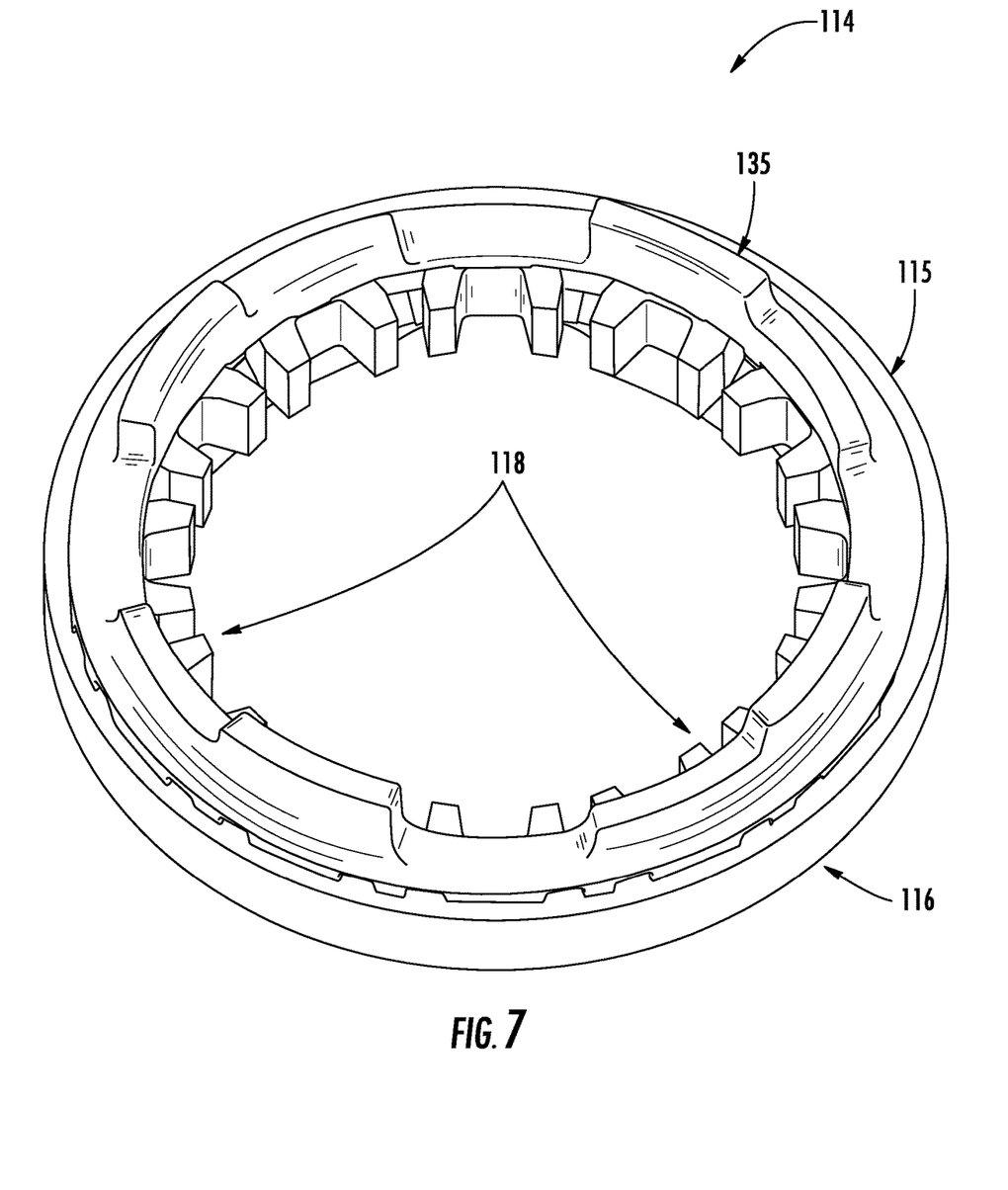
FIG. 7 depicts an isometric view of a portion of the stator assembly of FIG. 5 with the top and bottom covers of FIGS. 6A and 6B in accordance with an embodiment.

Turning now to FIG. 7 a portion of the stator assembly 115 is shown with the stator core 116, stator teeth 118 and top cover 135 and bottom cover (not shown) assembled in accordance with an embodiment.

Figure 8:
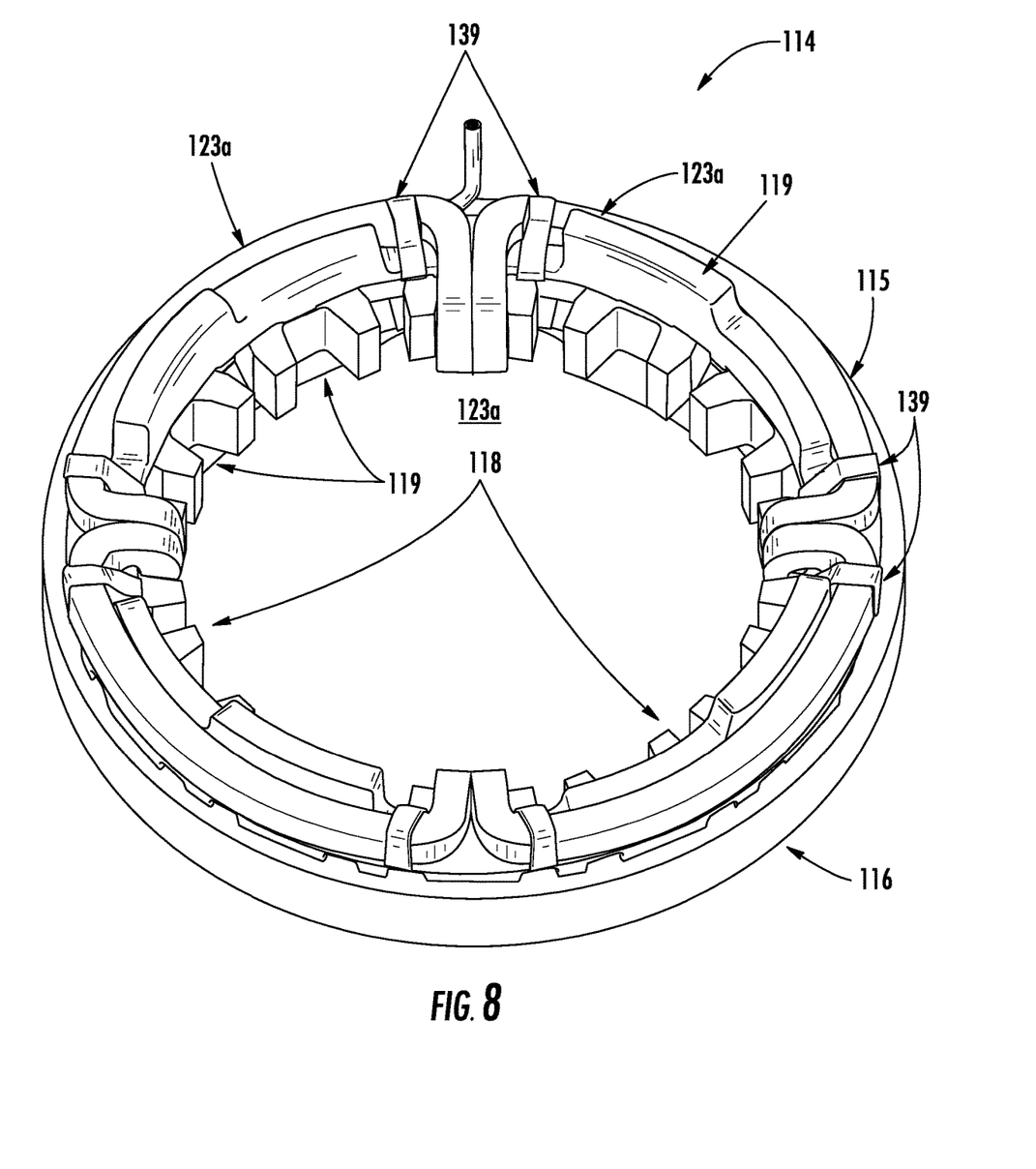
FIG. 8 depicts an isometric view of a portion of the stator assembly of FIG. 7 with a first stator coil installed in accordance with an embodiment.

FIG. 8 depicts an isometric view of a portion of the stator assembly 115 in accordance with an embodiment. The figure depicts the assembly of a first stator coil labeled 123a for this figure, for example, Phase A, in this instance with the partial stator assembly 115 of FIG. 7. Retention devices 139 ensure that the coil 123a is retained to the stator assembly 115. The retention devices 139 can be lacing or tie cord.

Figure 9:
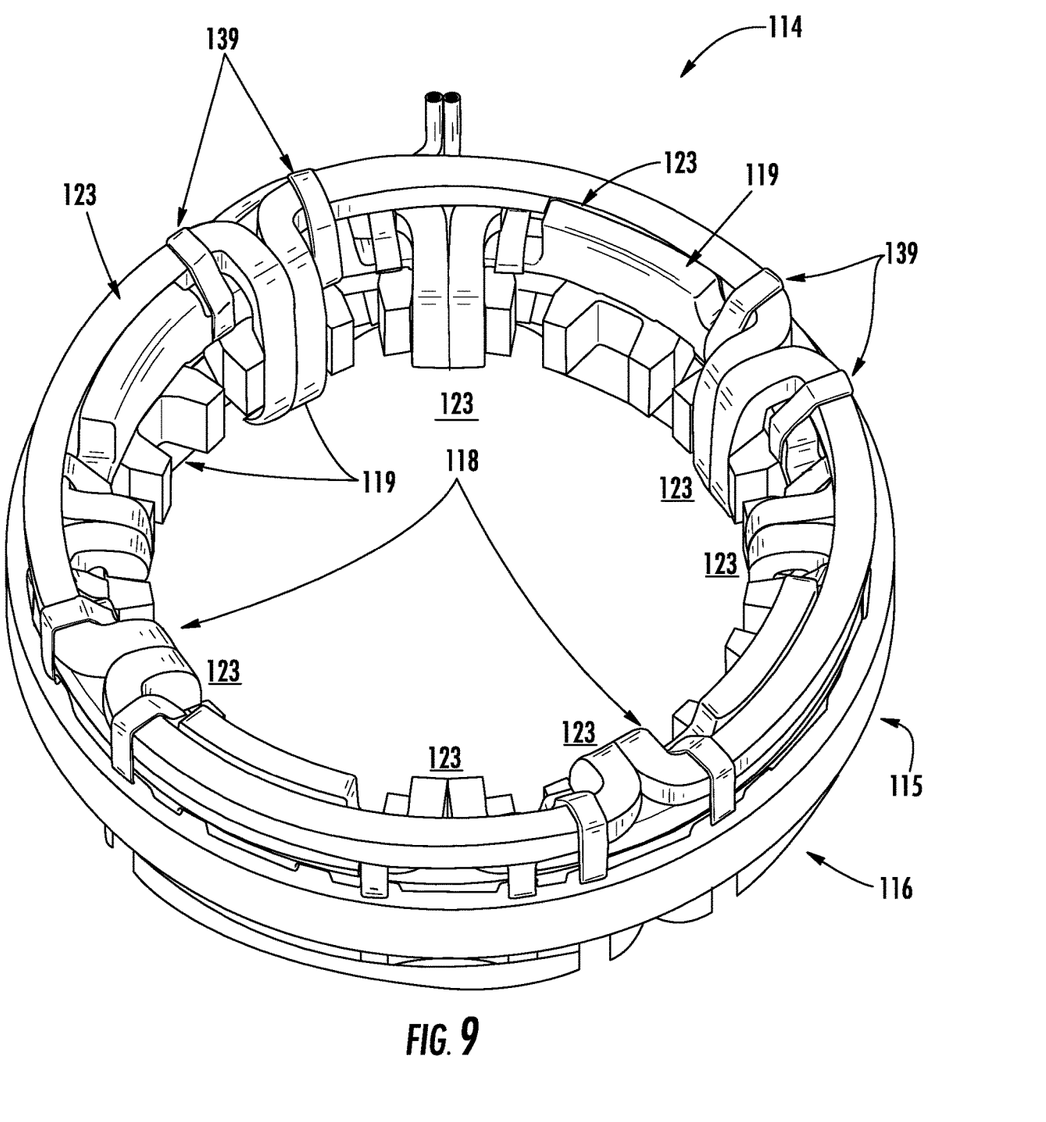
FIG. 9 depicts an isometric view of a portion of the stator assembly of FIG. 8 with a second stator coil installed in accordance with an embodiment.

FIG. 9 depicts an isometric view of a portion of the stator assembly 115 in accordance with an embodiment. The figure depicts the assembly of a second stator coil labeled 123b for this figure, for example, Phase B winding, in this instance with the partial stator assembly 115 of FIG. 8. Once again retention devices 139 ensure that the coil 123b is retained to the stator assembly 115.

Figure 10:
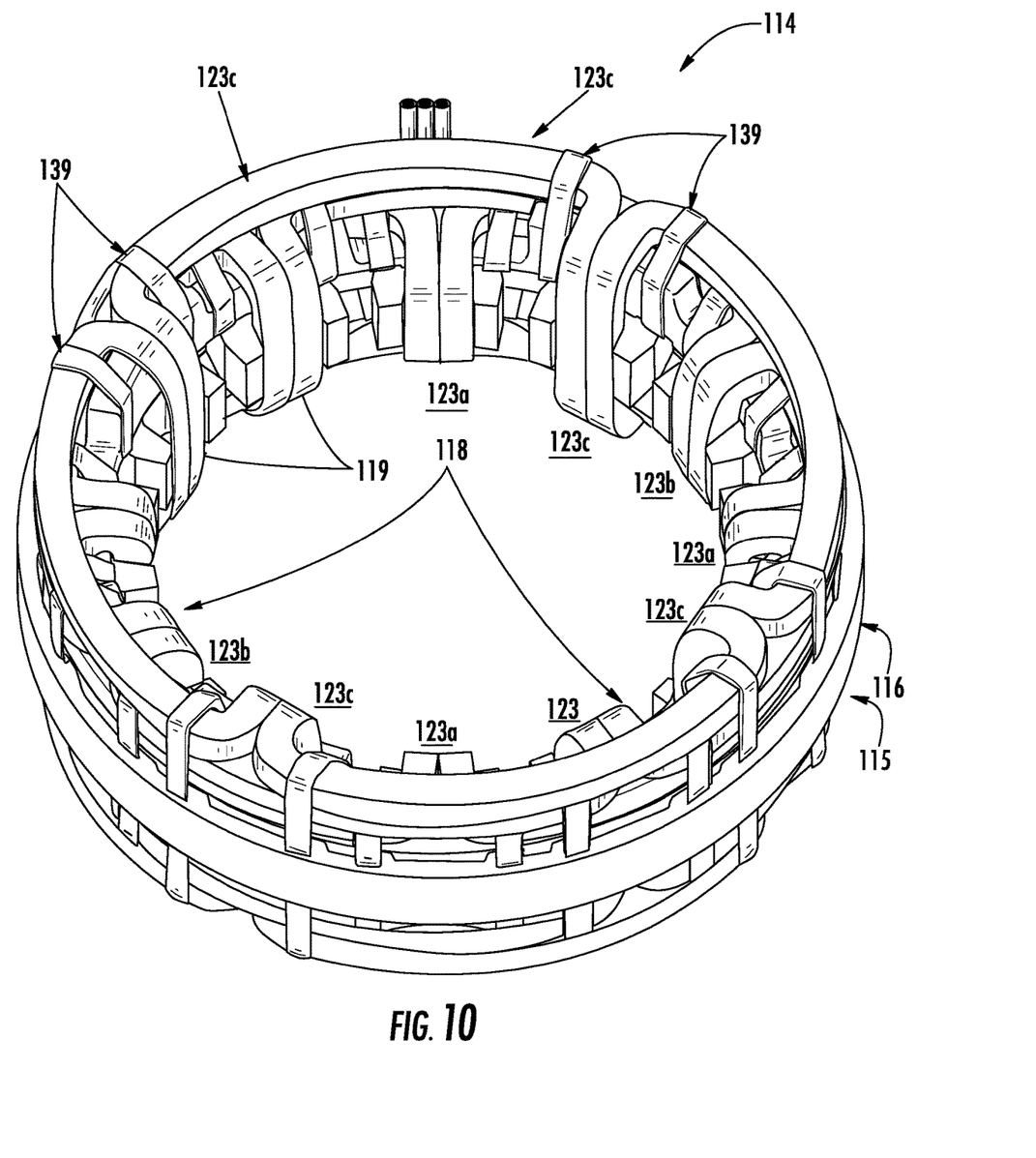
FIG. 10 depicts an isometric view of a portion of the stator assembly of FIG. 9 with a third stator coil installed in accordance with an embodiment.
Figure 11:
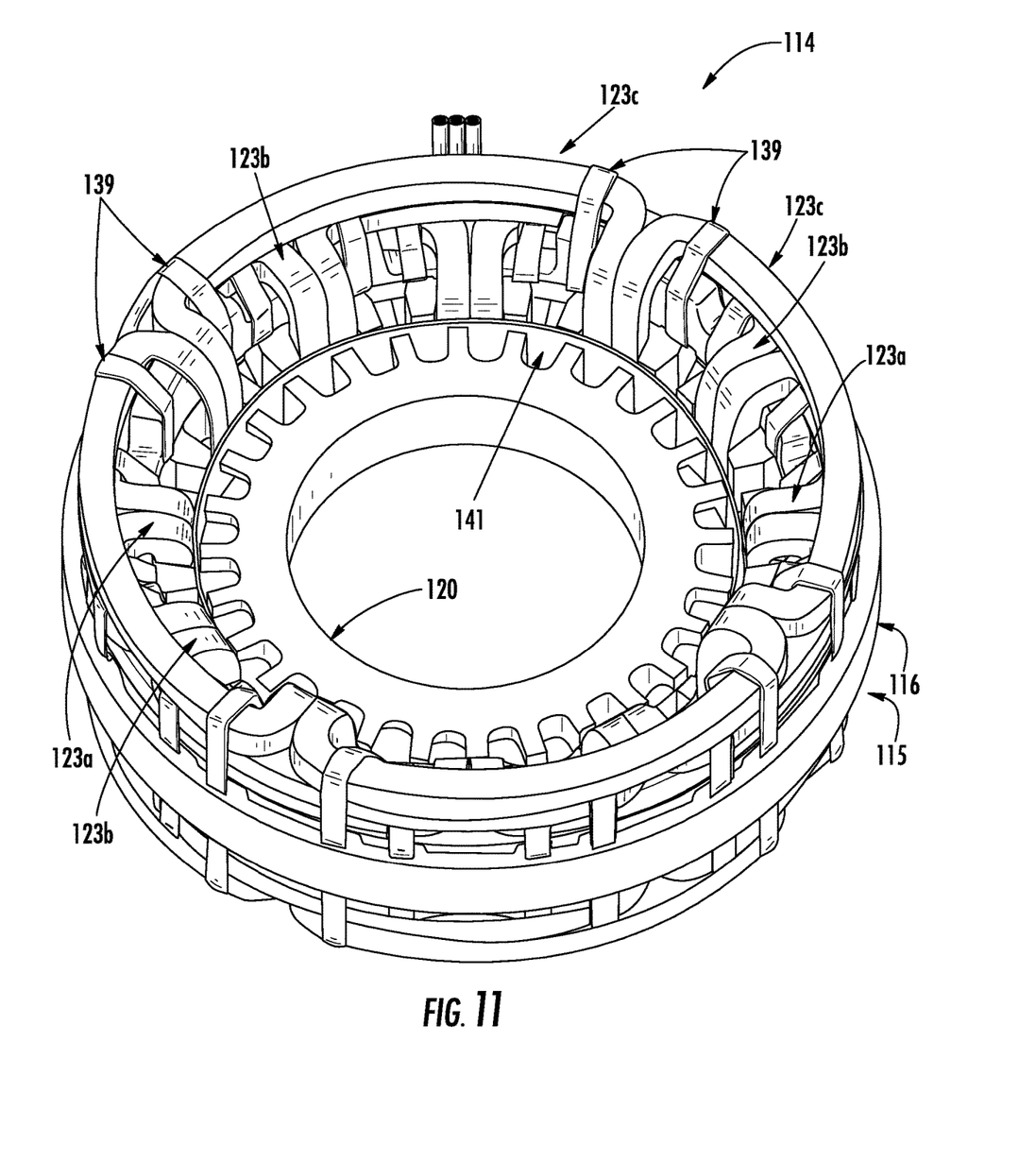
FIG. 11 depicts an isometric view of the assembled FSG with the complete stator assembly in accordance with an embodiment.

FIG. 10 depicts an isometric view of a portion of the stator assembly 115 in accordance with an embodiment. The figure depicts the assembly of a third stator coil labeled 123c for this figure, for example, Phase C windings, in this instance with the partial stator assembly 115 of FIG. 9. Once again retention devices 139 ensure that the coil 123C is retained to the stator assembly 115. FIG. 11 depicts an isometric view of the assembled FSG with the complete stator assembly 115 in accordance with an embodiment. The figure depicts the assembly of a retention ring 141 on the inner circumference of the stator assembly 115 and depicts the rotor assembly 120 placed within the stator assembly of FIG. 10.

It will be appreciated that while the disclosed embodiments have been described with respect to applications of a permanent magnet generator (PMG) as employed in a wound field synchronous machine (WFSM), those skilled in the art would recognize that the described embodiments may readily be applied in other electric machine and motor applications. For example in aerospace applications as permanent magnet alternators or pump motors, generators, position sensing, and the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A multiphase switched flux electric machine comprising:
    a rotary drive shaft;
    a single ferromagnetic salient pole rotor assembly operably coupled to the rotary drive shaft having a plurality of rotor teeth defining a circumferential outer periphery of the rotor assembly; and
    a stator assembly comprising:
        a single ferromagnetic stator core;
        a plurality of rectangular permanent magnets positioned substantially equidistant about an inner circumference of the single stator core;
        a plurality u-shaped ferromagnetic stator teeth radially inward from and mounted to the permanent magnets on the stator core with distal ends forming an inner periphery of the stator assembly, the inner periphery proximate the outer axial periphery of the rotor assembly separated by an air gap; and
        a plurality of stator coils with an axial active portions disposed within selected teeth of the plurality of ferromagnetic stator teeth, wherein the plurality of stator coils are stacked axially for each phase of the multiphase machine.

2. The multiphase switched flux electric machine of claim 1, wherein the ferromagnetic salient pole rotor is constructed of at least one of steel laminations, sintered magnetic powder, stamped ferromagnetic material, or a solid ferromagnetic material.

3. The multiphase switched flux electric machine of claim 1, wherein the salient pole rotor includes 28 rotor teeth.

4. The multiphase switched flux electric machine of claim 1, wherein the salient pole rotor is constructed of at least one of steel laminations, sintered magnetic powder, stamped ferromagnetic material, or a solid ferromagnetic material.

5. The multiphase switched flux electric machine of claim 1, wherein the ferromagnetic stator core is constructed of at least one of steel laminations, sintered magnetic powder, stamped ferromagnetic material, or a solid ferromagnetic material.

6. The multiphase switched flux electric machine of claim 1, wherein the ferromagnetic stator core is constructed without steel laminations.

7. The multiphase switched flux electric machine of claim 1, wherein the ferromagnetic stator core includes flat portions positioned about its inner circumference.

8. The multiphase switched flux electric machine of claim 7, wherein the substantially flat portions correspond to the permanent magnets and stator teeth.

9. The multiphase switched flux electric machine of claim 7, wherein the permanent magnets are substantially rectangular and configured to operably interface with the substantially flat portions of the ferromagnetic stator core.

10. The multiphase switched flux electric machine of claim 1, wherein the permanent magnets are substantially rectangular and include an arcuate surface configured to operably interface with the inner circumference of the ferromagnetic stator core.

11. The multiphase switched flux electric machine of claim 1, wherein the permanent magnets are magnetized circumferentially.

12. The multiphase switched flux electric machine of claim 1, wherein the u-shaped ferromagnetic stator teeth are substantially "U" shaped with a flat bottom configured to interface with the permanent magnets.

13. The multiphase switched flux electric machine of claim 1, wherein the ferromagnetic stator teeth is constructed of at least one of: steel laminations, sintered magnetic powder, stamped ferromagnetic material, and a solid ferromagnetic material.

14. The multiphase switched flux electric machine of claim 1, wherein the plurality of stator coils further include circumferential inactive portions disposed substantially at the circumference of but axially displaced from the stator core.

15. The multiphase switched flux electric machine of claim 1, further including at least one of a non-ferrous top cover and non-ferrous bottom cover, the least one of a non-ferrous top cover and non-ferrous bottom cover configured to at least one of hold the stator teeth and permanent magnets in a selected position and facilitate arrangement of the plurality of stator coils on the stator core.

16. The multiphase switched flux electric machine of claim 15, wherein the at least one of a non-ferrous top cover and non-ferrous bottom cover are constructed of a material that exhibits high thermal conductivity.

17. A WFSM having a generate mode and a starter mode, the WFSM comprising:
a three phase FSG having:
a rotary drive shaft;
a salient pole rotor assembly operably coupled to the rotary drive shaft having teeth defining an outer periphery of the rotor assembly;
a stator assembly comprising;
a single ferromagnetic stator core,
a plurality of rectangular permanent magnets positioned substantially equidistant about an inner circumference of the single stator core,
a plurality of u-shaped ferromagnetic stator teeth radially inward from and mounted to the permanent magnets on the single stator core with distal ends forming an inner periphery of the stator assembly, the inner periphery proximate the outer axial periphery of the rotor assembly separated by an air gap, and
a plurality of stator coils with an active portions disposed within selected teeth of the plurality of ferromagnetic stator teeth, wherein the plurality of stator coils are stacked axially for each phase of the multiphase machine;
an exciter coupled to said three phase FSG; and
a main machine coupled to said exciter, wherein the WFSM comprises a variable input speed range and a variable frequency (VF) architecture.

18. The WFSM of claim 17 operating in a generate mode wherein said three phase FSG provides excitation power for said exciter and the exciter energizes said main machine.

19. The WFSM of claim 17 further comprising a common rotor for said three phase FSG, said exciter and said main machine.

20. The WFSM of claim 17 further comprising a rectifier coupled between said exciter and said main machine, wherein said rectifier converts AC power from said exciter to DC power for said main machine.

21. A multiphase switched flux electric machine comprising:
a rotary drive shaft;
a ferromagnetic salient pole rotor assembly operably coupled to the rotary drive shaft having a plurality of rotor teeth defining a circumferential outer periphery of the rotor assembly; and
a stator assembly comprising:
a single ferromagnetic stator core;
a plurality of rectangular permanent magnets positioned substantially equidistant about an inner circumference of the single stator core;
a plurality of u-shaped ferromagnetic stator teeth radially inward from and mounted to the permanent magnets on the single stator core with distal ends forming an inner periphery of the stator assembly, the inner periphery proximate the outer axial periphery of the rotor assembly separated by an air gap; and
a plurality of axially stacked stator coils with axial active portions disposed within selected teeth of the plurality of ferromagnetic stator teeth, wherein the plurality of stator coils further include circumferential inactive portions disposed substantially at the circumference of but axially displaced from the stator core.

* * * * *